(12) United States Patent
Johnston et al.

(10) Patent No.: US 11,391,543 B2
(45) Date of Patent: Jul. 19, 2022

(54) ALIGNMENT RING FOR SCOPE

(71) Applicant: CRIMSON TRACE CORPORATION, Columbia, MO (US)

(72) Inventors: William Johnston, Tualatin, OR (US); Jason Clark, Beaverton, OR (US); Eric Petterson, Beaverton, OR (US); Eric David Marvin, Wilsonville, OR (US)

(73) Assignee: Crimson Trace Corporation, Columbia, MO (US)

( * ) Notice: Subject to any disclaimer, the term of this patent is extended or adjusted under 35 U.S.C. 154(b) by 0 days.

(21) Appl. No.: 17/113,415

(22) Filed: Dec. 7, 2020

(65) Prior Publication Data

US 2021/0108887 A1   Apr. 15, 2021

Related U.S. Application Data

(63) Continuation of application No. 16/586,438, filed on Sep. 27, 2019, now Pat. No. 10,859,345.

(60) Provisional application No. 62/739,126, filed on Sep. 28, 2018.

(51) Int. Cl.
*F41G 1/38* (2006.01)
*G02B 25/00* (2006.01)

(52) U.S. Cl.
CPC .............. *F41G 1/38* (2013.01); *G02B 25/001* (2013.01)

(58) Field of Classification Search
USPC .................................................. 42/111, 119
See application file for complete search history.

(56) References Cited

U.S. PATENT DOCUMENTS

| | | | |
|---|---|---|---|
| 3,777,404 A | * | 12/1973 | Oreck ....................... F41G 1/38 42/120 |
| 4,375,725 A | | 3/1983 | Orlob |
| 4,745,698 A | | 5/1988 | Schwulst |
| 4,850,113 A | * | 7/1989 | Doll ......................... F41G 1/42 42/130 |
| 6,032,374 A | | 3/2000 | Sammut |
| 6,557,291 B2 | * | 5/2003 | Hoadley ................... F41G 1/08 42/111 |
| 6,681,512 B2 | | 1/2004 | Sammut |
| 7,100,320 B2 | | 9/2006 | Verdugo |
| 7,185,455 B2 | | 3/2007 | Zaderey |
| D542,879 S | | 5/2007 | Zaderey |
| 7,530,193 B2 | | 5/2009 | Williamson, IV et al. |

(Continued)

FOREIGN PATENT DOCUMENTS

| | | | |
|---|---|---|---|
| DE | 3362464 A2 | 1/1985 | |
| GB | 2433606 A | 6/2007 | |
| WO | WO-9927408 A1 * | 6/1999 | ............. G02B 27/32 |

*Primary Examiner* — Reginald S Tillman, Jr.
(74) *Attorney, Agent, or Firm* — Stinson LLP

(57) ABSTRACT

Disclosed herein are alignment features for scopes, such as alignment rings for telescopic sights. For example, a scope can includes a proximal end having an interior surface. The proximal end is that which a user aligns his or her eye in order to visualize a target. The scope may also include an alignment ring on the interior surface of the proximal end. The alignment ring assists a user in determining whether his or her eye is properly aligned with a longitudinal axis of the scope. With correct eye alignment, the alignment ring is not visible. With incorrect eye alignment, at least a portion of the alignment ring is visible, thus ensuring accurate sighting.

41 Claims, 2 Drawing Sheets

(56) References Cited

U.S. PATENT DOCUMENTS

| | | |
|---|---|---|
| 8,064,132 B1 | 11/2011 | LeBlanc |
| D679,776 S | 4/2013 | Bracken et al. |
| D684,617 S | 6/2013 | Romero |
| 8,578,646 B2 | 11/2013 | Joannes |
| D700,944 S | 3/2014 | Mikroulis |
| D700,945 S | 3/2014 | Mikroulis |
| D706,328 S | 6/2014 | Romero |
| D716,409 S | 10/2014 | Mikroulis |
| D716,905 S | 11/2014 | Beckett et al. |
| D720,033 S | 12/2014 | Mikroulis |
| 8,910,412 B2 | 12/2014 | Mikroulis |
| 8,915,008 B2 | 12/2014 | Mauricio et al. |
| D726,280 S | 4/2015 | Mikroulis |
| 9,010,012 B2 | 4/2015 | Matthews et al. |
| D758,523 S | 6/2016 | Mikroulis |
| D767,077 S | 9/2016 | Mikroulis |
| D767,659 S | 9/2016 | Mikroulis |
| D767,660 S | 9/2016 | Mikroulis |
| D768,221 S | 10/2016 | Mikroulis |
| 9,593,908 B2 | 3/2017 | Hancosky |
| 9,759,519 B2 | 9/2017 | Hancosky |
| D814,601 S | 4/2018 | Hamilton et al. |
| D824,480 S | 7/2018 | Izumi |
| 10,113,835 B1 | 10/2018 | Stephenson |
| D834,629 S | 11/2018 | Mikroulis |
| 10,132,594 B2 | 11/2018 | Chou |
| D850,562 S | 6/2019 | Mikroulis |
| D850,563 S | 6/2019 | Mikroulis |
| D850,566 S | 6/2019 | Mikroulis |
| D865,112 S | 10/2019 | Mikroulis |
| D865,113 S | 10/2019 | Mikroulis |
| D865,114 S | 10/2019 | Mikroulis |
| D865,115 S | 10/2019 | Mikroulis |
| 10,514,233 B2 | 12/2019 | Sun et al. |
| D882,018 S | 4/2020 | Hamilton et al. |
| 10,859,345 B2 | 12/2020 | Johnston et al. |
| 2004/0201886 A1 | 10/2004 | Skinner et al. |
| 2019/0301834 A1 | 10/2019 | Hamilton et al. |
| 2019/0376766 A1 | 12/2019 | Fruechtel |
| 2020/0025518 A1 | 1/2020 | Nackel et al. |
| 2020/0271419 A1 | 8/2020 | Grace |

\* cited by examiner

ALIGNMENT RING FOR SCOPE

CROSS REFERENCE TO RELATED APPLICATIONS

This application claims priority to U.S. application Ser. No. 16/586,438, filed Sep. 27, 2019, now U.S. Pat. No. 10,859,345, which claims the benefit of U.S. Provisional Application No. 62/739,126 filed Sep. 28, 2018, the entireties of which are hereby incorporated by reference.

TECHNICAL FIELD

This disclosure relates to optical sighting devices, and in particular, to telescopic rifle scopes.

BACKGROUND

A telescopic sight, commonly called a scope, is an optical sighting device that is based on a refracting telescope. Scopes often are equipped with some form of graphic image pattern, such as a reticle, that is positioned in an optically appropriate position in the scope's optical system to provide the user with an accurate aiming point. Telescopic sights are used in all types of environments that require accurate aiming, but are most commonly found on firearms, particularly rifles.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
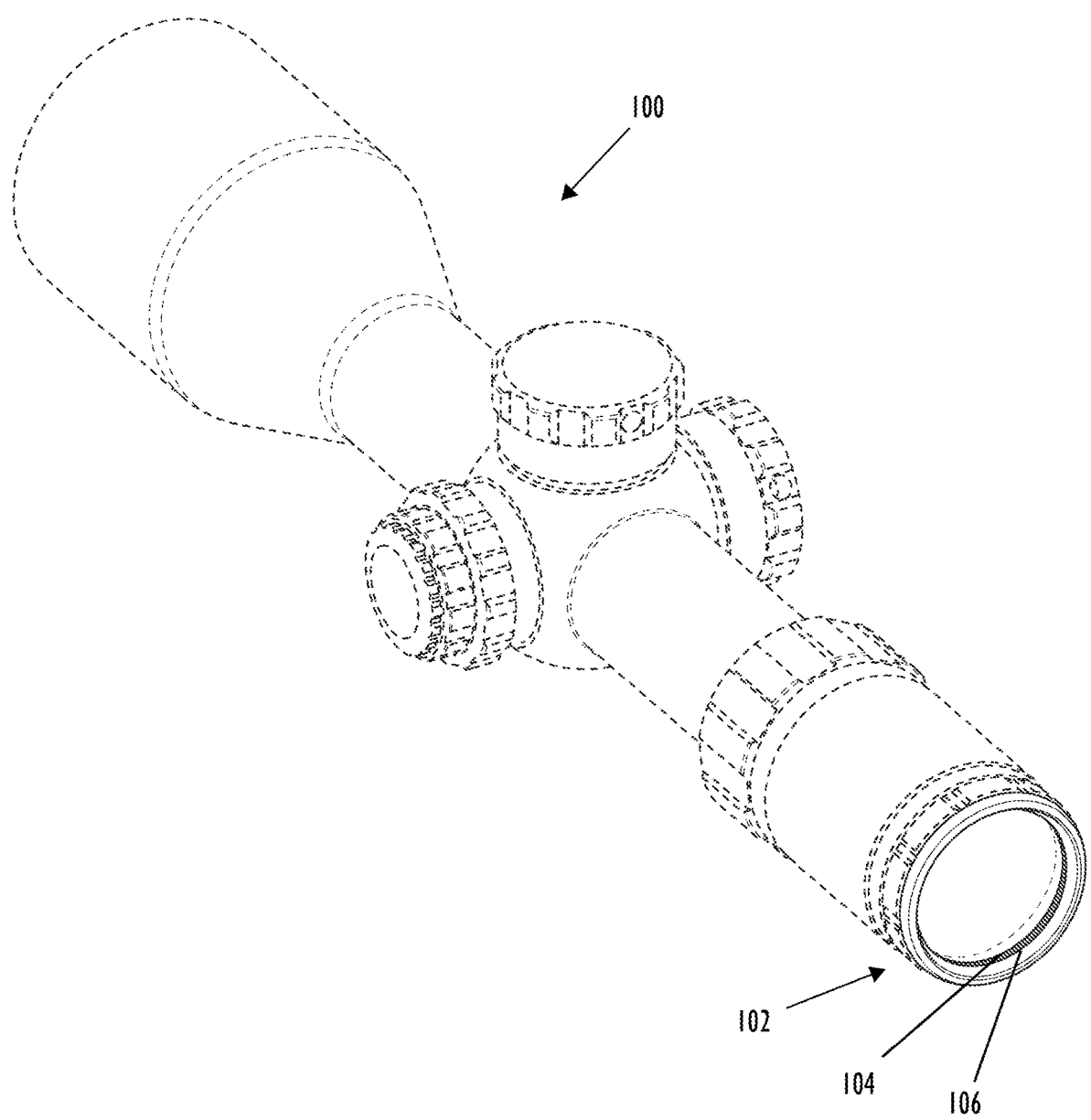
FIG. 1 is a perspective view of a scope, illustrating an alignment ring that is visually apparent to a user when the user's viewing angle is not correctly aligned with the longitudinal axis of the scope.

The patent or application file contains at least one drawing executed in color. Copies of this patent or patent application publication with color drawing(s) will be provided by the Office upon request and payment of the necessary fee.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

As used herein, the singular forms "a," "an," and "the" are intended to include the plural forms as well, unless the context clearly indicates otherwise.

As used herein, the term "and/or" refers to and encompasses any and all possible combinations of one or more of the associated listed items, as well as the lack of combinations when interpreted in the alternative ("or").

As used herein, "one or more" or at least one can mean one, two, three, four, five, six, seven, eight, nine, ten or more, up to any number.

As used herein, the term "comprises" or "comprising" mean "includes." Hence "comprising A or B" means including A, B, or A and B. "Comprise" and variations of the term, such as "comprising", "comprises" and "comprised", as used herein, mean that various additional components or steps can be conjointly employed.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide alignment features for optical sighting devices, such as telescopic rifle scopes, including, but not limited to, commercially available Crimson Trace Scopes as available on the world wide web products.crimsontrace.com/lasers/scope as of Sep. 25, 2019, such as CSA-2524 2-Series Sport Riflescope, CTL-3525 3-Series Tactical Riflescope, CTL-5324 5-Series Tactical Riflescope, CTL-5324-02 5-Series Tactical Riflescope. FIG. 1 is a perspective view of a scope, illustrating an alignment ring that is visually apparent to a user when the user's viewing angle is not correctly aligned with the longitudinal axis of the scope, in accordance with various embodiments. As illustrated in FIG. 1, a scope 100 may have a proximal end 102, with which a user aligns his or her eye in order to visualize a target. Accurate target visualization requires the user to precisely align his or her eye with the longitudinal axis of the scope. For example, if the user's eye is misaligned with the longitudinal axis by deviation to the left, right, top, bottom, etc., the accuracy of target sighting may be compromised. In some environments, it may be difficult to detect this misalignment.

In various embodiments, an alignment ring 104 may be provided to help a user determine whether his or her eye is properly aligned with the longitudinal axis of the scope, thus ensuring accurate sighting. The alignment ring 104 may have a distinctive color that is visually apparent to the user. For example, the alignment ring 104 may be red, yellow, blue, orange, silver, white, etc. against a darker background color of the scope 100 interior. In some embodiments, the color of the scope 100 interior may be black, gray, flat dark earth (FDE), gun metal gray, green, brown, camouflage, or the like. In some embodiments, the alignment ring 104 may be a continuous ring, whereas in other embodiment it may be a broken line or series of dots arranged in a circular ring pattern about the interior surface of the proximal end 102 of the scope 100. In some embodiment, the alignment ring may be iridescent or fluorescent, or may have any other characteristic that makes it visually apparent to the user.

In various embodiments, the alignment ring 104 may be recessed slightly, such as less than 0.015 inches, such as between 0.005-0.015 inches, behind a ridge, lip, or annular projection 106 such that all or a portion of the alignment ring 104 is visible to a user when the user's eye is not aligned with the longitudinal axis of the scope. As such, the alignment ring 104 may be visible to a user only when his or her eye is out of alignment with the longitudinal axis of the scope. Thus, the appearance of the alignment ring 104 may serve to alert the user that his or her eye is not aligned with the scope 100, and that aiming accuracy may be compromised. Additionally, the position of the portion of the alignment ring 104 that is visible to the user may serve as an indicator of the direction of the misalignment. For example, if a portion of the alignment ring 104 is visible on the left side of the user's field of view, a user will intuitively know to move his or her head to the left, toward the visible portion of the alignment ring 104 to correct the alignment issue.

Figure 2:
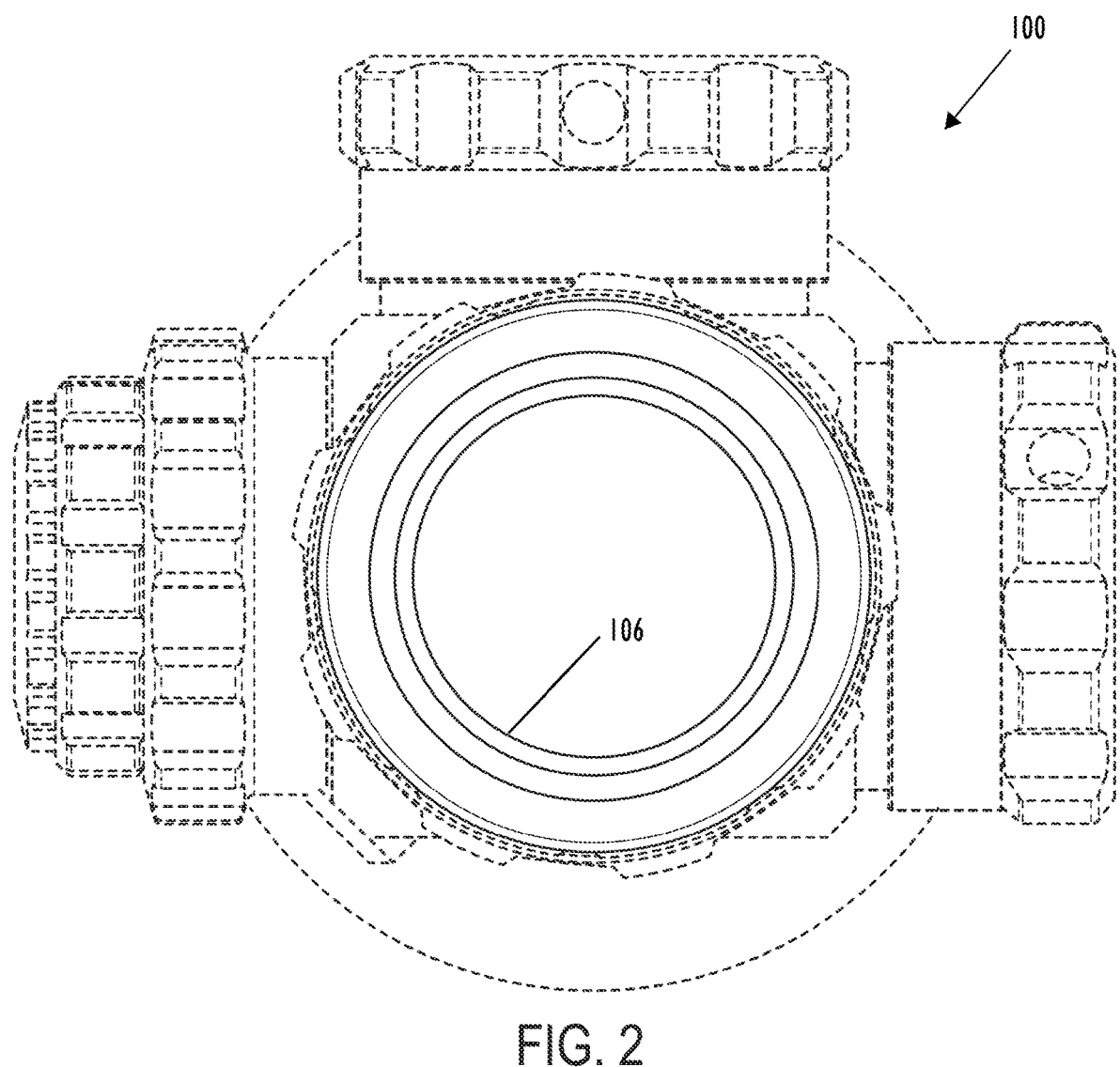
FIG. 2 is an end view of the scope, illustrating that the alignment ring disappears when the user's viewing angle is correctly aligned with the longitudinal axis of the scope, in accordance with various embodiments.

FIG. 2 is an end view of the scope, illustrating that the alignment ring disappears when the user's viewing angle is correctly aligned with the longitudinal axis of the scope, in accordance with various embodiments. Turning now to FIG. 2, the alignment ring (not visible) may be obscured by the ridge, lip, or annular projection 106 such that no portion of the alignment ring is visible. Disappearance of the alignment ring 104 may thus indicate that the user's eye is correctly positioned with respect to the longitudinal axis of the scope 100.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

We claim:

1. A sight for assisting a user's eye in sighting a target with a firearm, the sight comprising:

a sight body including an inner surface bounding a field of view through which the user can visualize the target;

an alignment indicator configured to assist the user in determining whether his or her eye is correctly aligned with the sight, the alignment indicator being configured to not be visible by the user's eye when the user's eye is in a correct eye alignment with respect to the sight body, and the alignment indicator being configured to be visible by the user's eye when the user's eye is in an incorrect eye alignment with respect to the sight body; and wherein the alignment indicator is configured to be perceived by the user as moving into the field of view from a side of the field of view when the user's eye moves away from the correct eye alignment and is configured to be perceived by the user as exiting the field of view out of the side of the field of view when the user's eye moves toward the correct eye alignment;

wherein the alignment indicator is configured to be perceived by the user as being disposed outboard of the inner surface when the user's eye is in the correct eye alignment with respect to the sight.

2. The sight of claim 1, wherein the alignment indicator comprises an alignment ring.

3. The sight of claim 2, wherein the alignment ring is a continuous ring.

4. The sight of claim 1, wherein the alignment indicator is colored to contrast with a color of the sight body.

5. The sight of claim 1, wherein the alignment indicator is red.

6. The sight of claim 1, wherein the alignment indicator comprises a plurality of alignment indicators.

7. The sight of claim 6, wherein each alignment indicator is configured to be perceived by the user as entering the field of view from a respective side of the field of view based on a direction the user's eye moves away from the correct eye alignment.

8. The sight of claim 6, wherein the alignment indicators comprise dashes of a broken line.

9. The sight of claim 6, wherein the alignment indicators comprise a series of dots.

10. The sight of claim 1, wherein the sight body includes a ridge, the alignment indicator being configured to be perceived by the user as appearing in the field of view from behind the ridge when the user's eye moves away from the correct eye alignment and to be perceived by the user as disappearing from the field of view behind the ridge when the user's eye moves toward the correct eye alignment.

11. The sight of claim 1, wherein the sight body includes a lip, wherein the alignment indicator is configured to be perceived by the user as appearing in the field of view from behind the lip when the user's eye moves away from the correct eye alignment and to be perceived by the user as disappearing from the field of view behind the lip when the user's eye moves toward the correct eye alignment.

12. The sight of claim 1, wherein the sight body includes an annular projection, wherein the alignment indicator is configured to be perceived by the user as appearing in the field of view from behind the annular projection when the user's eye moves away from the correct eye alignment and to be perceived by the user as disappearing from the field of view behind the annular projection when the user's eye moves toward the correct eye alignment.

13. The sight of claim 1, wherein the sight body includes a proximal end with which the user aligns his or her eye for the correct eye alignment with the sight, the alignment indicator being a physical structure disposed on the proximal end.

14. The sight of claim 13, wherein the proximal end has an interior surface, the alignment indicator being disposed on the interior surface.

15. The sight of claim 1, wherein the alignment indicator is configured to be blocked from view by the user's eye by the sight body when the user's eye is in the correct eye alignment.

16. The sight of claim 1, wherein the side of the field of view is a top side or a bottom side of the field of view.

17. The sight of claim 1, wherein the sight body comprises a housing and the sight further comprises a lens supported by the housing.

18. The sight of claim 1, wherein the sight is a telescopic sight.

19. A sight for assisting a user's eye in sighting a target with a firearm, the sight comprising:
a lens through which the user can visualize the target in a field of view of the sight;
a sight body connected to the lens, the sight body including a surface configured to bound the field of view when the user looks through the field of view; and
an alignment indicator configured to assist the user in determining whether his or her eye is correctly aligned with the sight, the alignment indicator being configured to be visible by the user's eye in the field of view when the user's eye is in an incorrect eye alignment with respect to the sight, and the alignment indicator being configured to be perceived by the user as at least partially exiting the field of view out of a side of the field of view when the user's eye moves toward a correct eye alignment with respect to the sight;
wherein the alignment indicator is configured to be perceived by the user as being disposed outboard of said surface of the sight body when the user's eye is in the correct eye alignment with respect to the sight and looking through the field of view.

20. A method of aligning an eye of a user with a sight of a firearm, the method comprising:
looking through a field of view of the sight with the eye of the user, the field of view bounded by a surface of a frame of the sight;
observing, in the field of view, an alignment indicator; and
reducing misalignment of the sight with respect to the user's eye so the user perceives at least a portion of the alignment indicator as exiting the field of view out of a side of the field of view, thereby indicating the eye of the user is in improved eye alignment with the sight, wherein the alignment indicator is configured so said at least a portion of the alignment indicator is perceived by the user as being disposed outboard of the surface of the frame when the user's eye is in the improved eye alignment with the sight.

21. The sight of claim 1, wherein the alignment indicator has an alignment indicator width and the field of view has a field of view width, the alignment indicator being configured so the alignment indicator width is perceived by the user as being greater than the field of view width when the user looks through the field of view.

22. The sight of claim 2, wherein the alignment ring has an inner diameter, the inner diameter being perceived by the user as being larger than a widthwise dimension and a heightwise dimension of the field of view when the user looks through the field of view.

23. The sight of claim 1, wherein the alignment indicator has an alignment indicator width and the field of view has a field of view width, the alignment indicator width being greater than the field of view width.

24. The sight of claim 1, wherein the sight body includes a frame and the sight further comprises a lens supported by the frame, the inner surface being defined by the frame.

25. The sight of claim 1, wherein a portion of the alignment indicator is configured to be visible to the user's eye, when the user's eye is in the incorrect eye alignment with respect to the sight body, in a position to serve as an indicator of a direction of the incorrect eye alignment.

26. The sight of claim 1, wherein the alignment indicator is configured to be perceived by the user as entering the field of view from the side of the field of view based on a direction the user's eye moves away from the correct eye alignment.

27. The sight of claim 1, wherein the inner surface extends around the field of view.

28. The sight of claim 19, wherein the alignment indicator comprises an alignment ring.

29. The sight of claim 28, wherein the alignment ring is a continuous ring.

30. The sight of claim 19, wherein the alignment indicator comprises a plurality of alignment indicators.

31. The sight of claim 30, wherein each alignment indicator is configured to be perceived by the user as entering the field of view from a respective side of the field of view based on a direction the user's eye moves away from the correct eye alignment.

32. The sight of claim 19, wherein the sight body includes a ridge, the alignment indicator being configured to be perceived by the user as appearing in the field of view from behind the ridge when the user's eye moves away from the correct eye alignment and to be perceived by the user as disappearing from the field of view behind the ridge when the user's eye moves toward the correct eye alignment.

33. The sight of claim 19, wherein the sight body includes a lip, wherein the alignment indicator is configured to be perceived by the user as appearing in the field of view from behind the lip when the user's eye moves away from the correct eye alignment and to be perceived by the user as disappearing from the field of view behind the lip when the user's eye moves toward the correct eye alignment.

34. The sight of claim 19, wherein the sight body includes an annular projection, wherein the alignment indicator is configured to be perceived by the user as appearing in the field of view from behind the annular projection when the user's eye moves away from the correct eye alignment and to be perceived by the user as disappearing from the field of view behind the annular projection when the user's eye moves toward the correct eye alignment.

35. The sight of claim 19, wherein the sight body includes a proximal end with which the user aligns his or her eye for the correct eye alignment with the sight, the alignment indicator being a physical structure disposed on the proximal end.

36. The sight of claim 35, wherein the proximal end has an interior surface, the alignment indicator being disposed on the interior surface.

37. The sight of claim 19, wherein the alignment indicator is configured to be blocked from view by the user's eye by the sight body when the user's eye is in the correct eye alignment.

38. The sight of claim 19, wherein the side of the field of view is a top side or a bottom side of the field of view.

39. The sight of claim 19, wherein the sight body comprises a frame supporting the lens and the frame defines said surface of the sight body.

40. The sight of claim 19, wherein the sight is a telescopic sight.

41. The sight of claim 19, wherein the alignment indicator has an alignment indicator width and the field of view has a field of view width, the alignment indicator being configured so the alignment indicator width is perceived by the user as being greater than the field of view width when the user looks through the field of view.

\* \* \* \* \*